Oct. 23, 1934.  C. A. RITCHIE  1,978,030
METHOD OF MAKING SHEET RUBBER MATERIAL
Filed Oct. 31, 1933
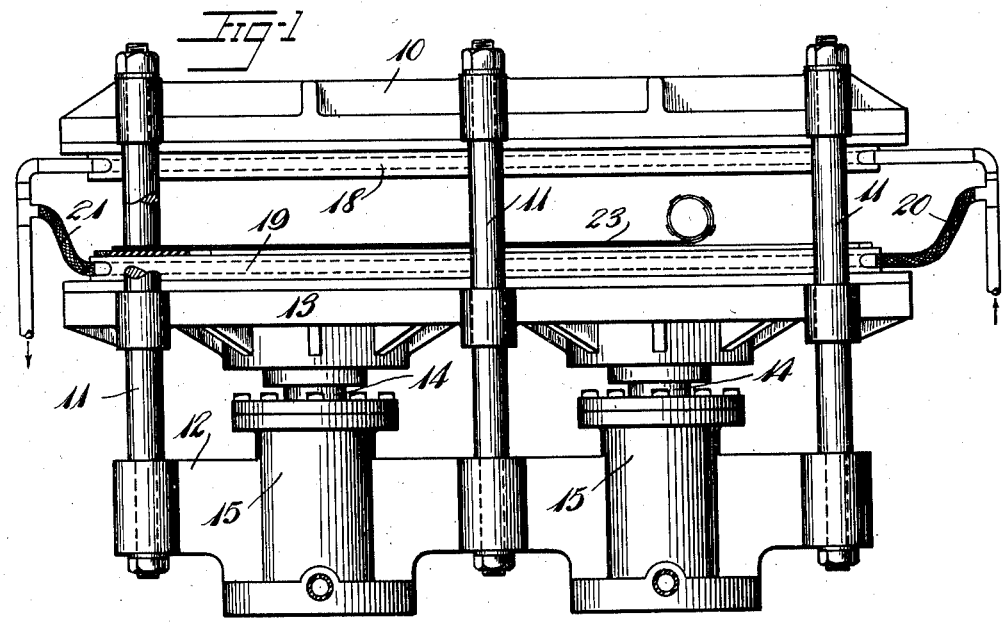
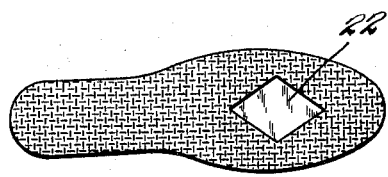
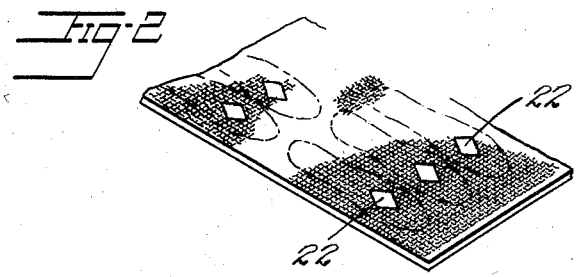
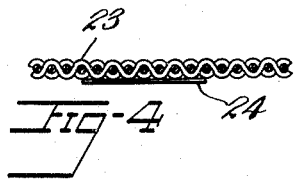
Inventor
Clarence A. Ritchie
By Eakin & Avery
Attys.

Patented Oct. 23, 1934

1,978,030

UNITED STATES PATENT OFFICE 1,978,030

METHOD OF MAKING SHEET RUBBER MATERIAL

Clarence A. Ritchie, Akron, Ohio, assignor to The B. F. Goodrich Company, New York, N. Y., a corporation of New York Application October 31, 1933, Serial No. 696,043

2 Claims. (Cl. 18—56)

This invention relates to the manufacture of sheet rubber material and is especially useful in the manufacture of rubber sole material and matting.

It is customary to produce sheet material, such as that shown in Fig. 2 from which soles such as that illustrated in Fig. 3 are cut, by pressing a sheet of unvulcanized rubber composition between mold members, one of which is engraved to form the desired surface ornamentation. As the cost of such molds is high and the shrinkage of the rubber is relatively great, particularly in regard to compositions suitable for shoe soles, the production of such sheet has been practically confined to the production of small sheets, in the use of which the amount of waste due to cutting soles therefrom has been high.

The principal objects of the invention are to reduce the effects of shrinkage in the finished article, to provide an embossed sheet having clear impressions accurately arranged and to provide a method of producing such material in large sheets.

Other objects will appear from the following description and the accompanying drawing.

Of the drawing:

Fig. 1 is a side elevation of a vulcanizing press in open position showing the impression sheet being placed.

Fig. 2 is a perspective view of a portion of an embossed rubber sheet.

Fig. 3 is a plan view of a shoe sole made by this method.

Fig. 4 is an enlarged sectional view of a portion of the impression sheet.

Referring to the drawing:

In Fig. 1 is illustrated a hydraulic press such as may be used for molding long sheets of rubber. It comprises an upper fixed platen 10, supported by tension rods 11 from a bed plate 12, and a movable platen 13 supported on a plurality of rams 14 operated by cylinders 15.

Removable hollow mold members 18, 19 are supported by the platens and adapted to be heated by steam, suitable flexible connections 20 and 21 being provided for the movable mold member 19. Such a press may be of any desired length and, where plain mold members are provided, may be used for molding any plain surfaced sheet.

Where compositions suitable for producing shoe soles are molded in such a press, a shrinkage of the material takes place after vulcanization. Where the soles to be cut are to be provided with medallions, such as 22, the shrinkage of the rubber changes the spacing of the impressed medallions to such an extent as to result in improperly cut soles or waste of material.

It is desirable so evenly to space the medallions that the cutting operation may be performed automatically and in succession along the sheet.

In order greatly to reduce or practically eliminate shrinkage, I find that the sheet may be molded between plain mold members and that upon opening the press, substantially all shrinkage will take place before the molded sheet is cool. I also find that the vulcanized sheet may then be reformed between plates one of which is engraved or otherwise adapted to impress the face of the sheet. Such impressions, if made while the sheet is warm, will retain their approximate proportions and arrangement.

In order to avoid the expense of large engraved mold plates, I provide a sheet of woven metal fabric 23 corresponding in length and width to the sheet to be impressed, and, on the face thereof, fasten, by soldering or otherwise, spaced metal medallion-forming members 24. The sheet of metal fabric may be stored in roll form and unrolled across the rubber sheet, as indicated in Fig. 1, when the press is open.

After vulcanization of the sheet, the press is opened, the sheet permitted to shrink, and the metal fabric superimposed on the sheet of rubber. The press is again closed, forcing the metallic matrix into the warm rubber. The surface of the rubber between medallions is forced into the interstices of the wire fabric but does not flow around the wires due to the fact that the rubber is vulcanized. The application of the impression member to the warm sheet for a short interval is sufficient permanently to impress the surface thereof. The press is opened and the impression member and rubber sheet removed.

The spacing of the medallion impressions when made after vulcanization is more accurate and results in a saving of rubber, as the medallions may be spaced closer, less allowance for shrinkage being required.

While the invention is not limited to the use of a flexible wire fabric impression member, the use of such members makes possible rapid changing of designs, greatly reduces mold cost, and speeds up production.

I claim:

1. The method of making embossed sheet rubber which comprises molding a plain faced sheet of rubber composition while vulcanizing the same, permitting the sheet to shrink, then impressing the surface to provide spaced embossed elements on its surface, and then separating the sheet between spaced embossings to provide a plurality of embossed articles.

2. The method of making embossed sheet rubber which comprises simultaneously molding and vulcanizing a body of rubber to provide a plain-faced sheet, permitting the sheet to shrink, and while it is still warm impressing a surface of the sheet permanently to form an embossed surface.

CLARENCE A. RITCHIE.